(12) United States Patent
Pohl

(10) Patent No.: US 11,922,586 B1
(45) Date of Patent: Mar. 5, 2024

(54) FIREARM SIGHT IMPROVEMENTS USING OLED OR LCOS ARRAYS

(71) Applicant: Future Optek LLLC, Boca Raton, FL (US)

(72) Inventor: Matthew Pohl, Boca Raton, FL (US)

( * ) Notice: Subject to any disclaimer, the term of this patent is extended or adjusted under 35 U.S.C. 154(b) by 125 days.

(21) Appl. No.: 17/737,947

(22) Filed: May 5, 2022

Related U.S. Application Data

(60) Provisional application No. 63/184,849, filed on May 6, 2021, provisional application No. 63/184,853, filed on May 6, 2021, provisional application No. 63/184,859, filed on May 6, 2021.

(51) Int. Cl.
*G06T 19/00* (2011.01)
*F41G 3/16* (2006.01)

(52) U.S. Cl.
CPC ............ *G06T 19/006* (2013.01); *F41G 3/165* (2013.01)

(58) Field of Classification Search
None
See application file for complete search history.

(56) References Cited

PUBLICATIONS

AR-Weapon: Live Augmented Reality based First-Person Shooting System.

*Primary Examiner* — Robert J Craddock
(74) *Attorney, Agent, or Firm* — Gugliotta & Gugliotta LP

(57) ABSTRACT

Augmented reality eyewear are provided removing need to aim-down-sight while using a firearm. Eyewear have accelerometer sensors outputting a "view angle" that is compared with line of sight or "head angle" and true horizon. A camera system outputs the target distance. A firearm equipped with one or more accelerometers output a trajectory. With the firearm and goggles within an arms length proximity of one another, data points can be combined to create a full 3D spacial image of the bullet's path. Target distance determines the length of the trajectory and "termination coordinates" describing the projectile's target in space relative to the user's personal coordinate system (i.e., view angle). Relative termination coordinates can then be delivered to the goggle drivers. The termination coordinates are converted to a pixel command generating an illuminated aiming reticle that corresponds with the direction a firearm is pointing and overlaid on the target.

9 Claims, 7 Drawing Sheets

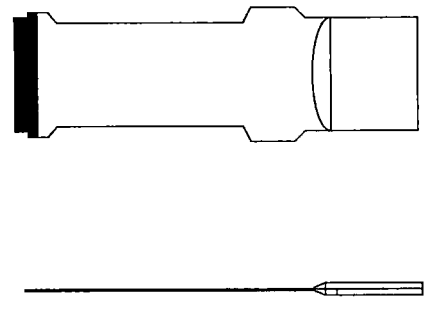
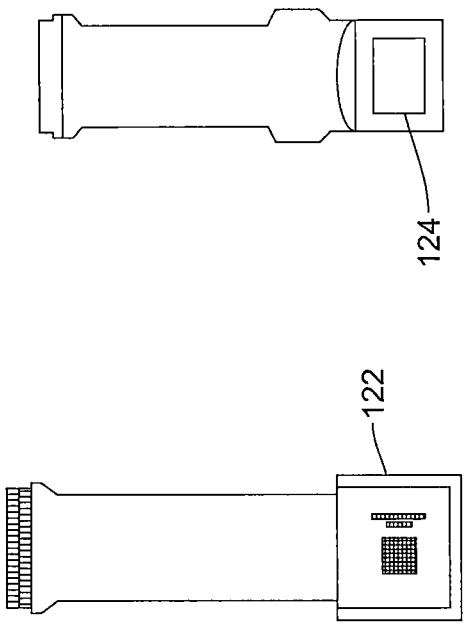
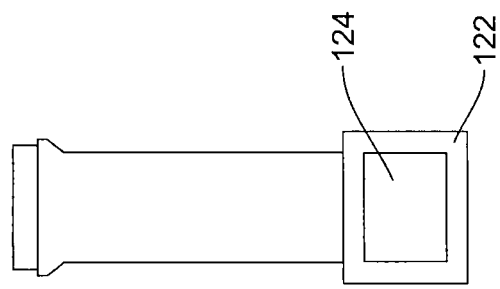
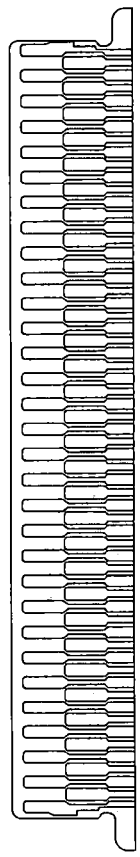

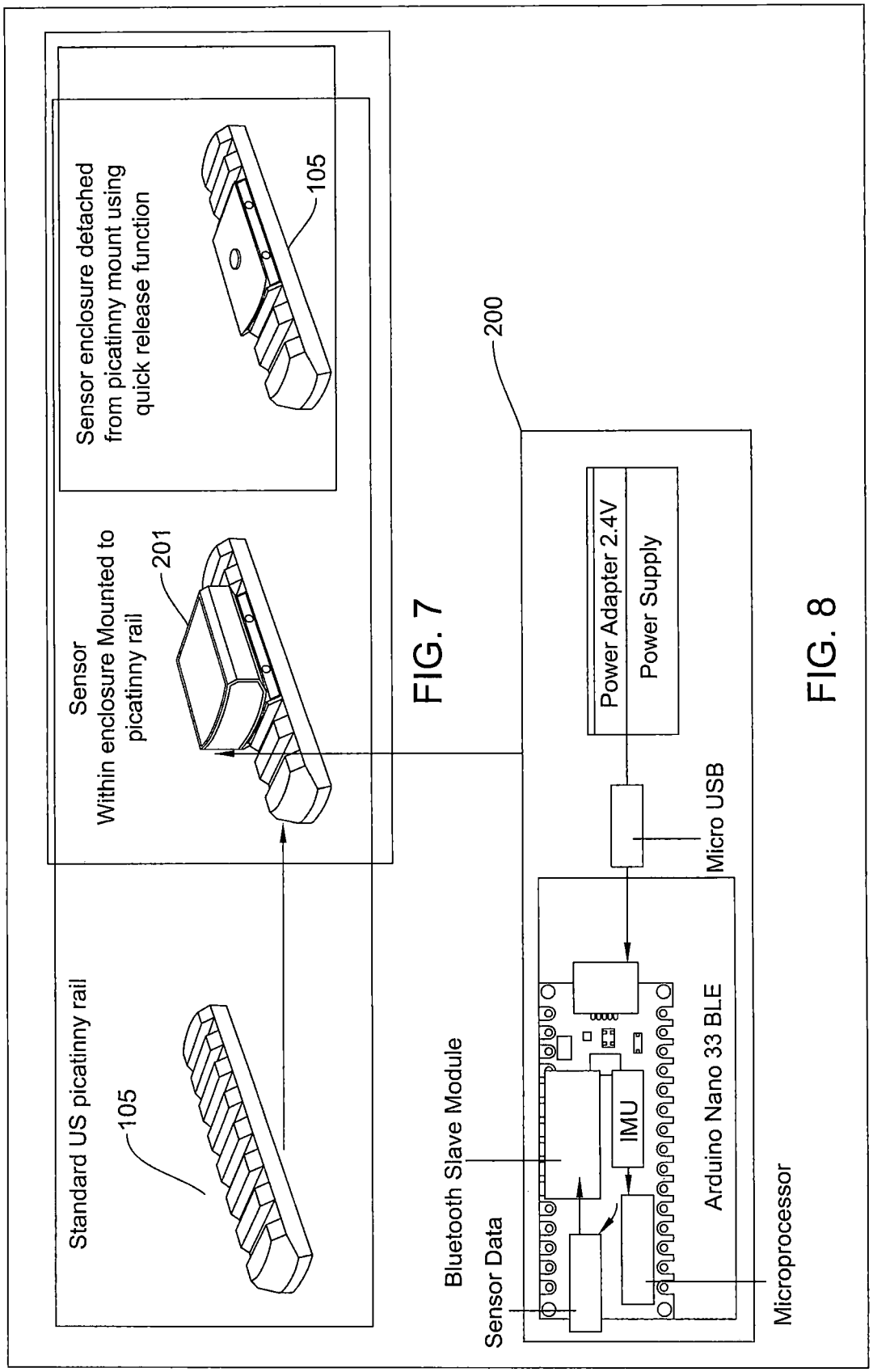

FIREARM SIGHT IMPROVEMENTS USING OLED OR LCOS ARRAYS

RELATED APPLICATIONS

The present invention claims benefit of U.S. Provisional Patents No. 63/184,849, 63/184,853 and 63/184,859, all filed on 6 May 2021 and incorporated by reference as if fully rewritten herein.

BACKGROUND OF THE INVENTION

1. Field of the Invention

The present invention relates generally to the incorporation of augmented reality adaptable to a variety of applications and, more particularly, to applied local systems using line of sight and hand position and orientation data for waveguide based OLED or LCoS displays.

2. Description of the Related Art

Augmented reality (AR) is a general descriptor that is used for an interactive experience of a real-world environment where the objects that reside in the real world are enhanced by computer-generated perceptual information. In contrast with virtual reality (VR) where a user's perception of reality is completely based on virtual information, in AR applications a user is provided with both real world inputs in combination with additional computer generated information to enhance perception. This additional information may include, generally, visual, auditory, haptic, somatosensory and olfactory input in combination with real-time interaction between virtual and real objects.

A primary value of augmented reality is to enhance natural environments or situations and offer perceptually enriched experiences. With the help of advanced AR technologies (e.g., adding computer vision, incorporating AR cameras into smartphone applications and object recognition) the information about the surrounding real world of the user becomes interactive and digitally manipulated.

Heads Up Displays (HUD) are also widely available for various applications in which a transparent display is used to present data without requiring users to look away from their usual viewpoints. The origin of the name stems from a pilot being able to view information with the head positioned "up" and looking forward, instead of angled down looking at lower instruments. A HUD also has the advantage that the pilot's eyes do not need to refocus to view the outside after looking at the optically nearer instruments.

The combined benefits of both augmented reality technology and heads up display technology (HUD) are also known in limited applications. Augmentation techniques are typically performed in real time and in conjunction with environmental elements creates an immersive display of information. The most common use of this combination is the combination of supplemental information like scores over a live video feed of a sporting event.

Some methods and devices are known that incorporate various mechanisms of AR or HUD in conjunction with improvements for ballistic weapons systems. For example:

U.S. Pat. No. 8,678,282 issued in the name of Black et al. discloses an aim assist head-mounted display apparatus. While this reference does mention the use of "orientation information" to correlate a view of the terrain or real world with the sensed weapon's orientation, there is little or no enablement whatsoever as to "how" thee orientation information is acquired or used, and especially fails to anticipate or teach the use of changes in voltage from accelerometer sensors to directly calibrate the viewing image. Further, the use of GPS and cameras coupled with computer vision, which is accompanied by expensive computational components, presents both cost and situational use limitations without any tactical advantage.

And, U.S. Patent Application Publication US 2006/0248777, published in the name of Florence et al., discloses a Method and apparatus for safe operation of an electronic firearm sight where the sight only presents certain information on a display if the orientation of the sight satisfies orientation criteria. Although mentioning similar approaches to visualizing coordinates in a firearm optic, this invention ultimately does not involve and heads up displays (HUD), augmented reality platforms or see-through-display systems.

There are limited commercial products that attempt to provide elements of augmented reality with elements of see-through or heads-up displays. ThirdEye Gen Inc. of Princeton, NJ provides mixed reality glasses and augmented/mixed reality software. The mixed reality glasses are intended for hands-free human interaction via directly interacting with surrounding objects or placing digital information into a wearer's field of view. ThirdEye Gen's X2 Mixed Reality Glasses provide a wide field of view and contain powerful sensors within a minimal form factor. Lumus, an Israeli-based Augmented Reality company headquartered in Ness Ziona, Israel, has developed technology for see-through wearable displays, via its patented Light-guide Optical Element (LOE) platform to market producers of smart glasses and augmented reality eyewear. Lumus' technology enables a small natural looking form factor, wide field of view and true see-through performance. And, Microsoft HoloLens are a pair of mixed reality smart glasses developed and manufactured by Microsoft. HoloLens was the first head-mounted display running the Windows Mixed Reality platform under the Windows 10 computer operating system. The tracking technology used in HoloLens can trace its lineage to Kinect, an add-on for Microsoft's Xbox game console that was introduced in 2010.

These commercial options incorporate waveguide arrays that utilize holographic technology. However, advantages over these options have been identified using OLED or LCoS arrays for use in ballistic weapons aiming systems using approaches not otherwise anticipated in order to achieve performance and cost benefits throughout robust environments.

SUMMARY OF THE INVENTION

It is thus an object of the present invention to provide an augmented reality glasses which remove the need to aim-down-sight while using a firearm.

It is a feature of the present invention to an augmented reality heads up display aiming system for use as a firearms sight in which an augmented reality anticipated ballistic trajectory image may be generated utilizing comparative accelerometer outputs coordinated between a firearm position and a display position to control an illuminated reticle.

The present invention provides augmented reality glasses which remove the need to aim-down-sight while using a firearm. Generally, the system consist of goggles or glasses in communication with a firearm. The goggles or glasses may have one or more accelerometers which output a "view angle". The view angle is compared with a user's line of sight or "head angle" as well as true horizon. The goggles or glasses are also equipped with a simple camera system which outputs the target distance. Further, the firearm is equipped similarly with one or more accelerometers that output a trajectory of the firearm. With the firearm and goggles within an arms length proximity of one another, data points can be combined to create a full 3D spacial image of the bullet's path. The target distance from the goggles determines the length fo the trajectory, which yields "termination coordinates" describing the projectile's target in space relative to the user's personal coordinate system (i.e., view angle). Relative termination coordinates can then be delivered to the goggle drivers. The termination coordinates may be converted to a pixel command and ultimately illuminated as a 'red dot' or aiming reticle that corresponds with the direction a firearm is pointing and overlaid on the target.

The aiming reticle is augmented with a virtual visualization of a linear trajectory. The linear trajectory may correspond to a bullet path. The glasses comprise a viewing lens forming a 'See-Through-Display' of transparent material that incorporate a superimposed image onto/within the lens. An optical wave guide is formed of an organic light-emitting diode (OLED or organic LED) providing an electroluminescent layer film of organic compound that emits light in response to an electric current. In a functionally equivalent alternate embody the OLED optical wave guide may be replaced using a liquid crystal on silicon ("LCoS" or "LCOS") array to provide a superimposed image of light in response to the electric current.

The uses of OLED or LCoS waveguides allow for the control of the superimposed image of light electronically utilizing changes in voltage based on tilt, with the voltage being calibrated to work with the see-through-display lens platform's voltage range. This may provide substantial performance improvements and cost reductions, while allowing for robust operations in a variety of environments.

Compared to current red-dot optics, the present invention incorporate a similar aiming mechanism, but does so directly into an eyeglass mounted display in order to avoid the need to aim down sight by utilizing a firearm's sight systems and methods that combine augmented reality in combination with heads up displays.

The present invention's operation and configuration obviate the difficulties associated with calibrating conventional red dot sight, primarily ensuring the conventional optic is co-witnessed, mounted appropriately, and 'zeroed in' to account for discrepancies between the red dot and actual bullet trajectory—which can only be done by firing the weapon and adjusting its X and Y coordinates to more closely reflect the actual trajectory.

An advantage of the present invention provides for utilization of Bluetooth as a communication protocol, allowing for a common a familiar protocol allowing for a sufficient and significant range to the end user that is not proprietary or would otherwise need special equipment use training.

Further advantages of the present invention provide co-witnessing, calibration, rapid target acquisition, ease of mounting, and cost savings across multiple optics irrespective of performance.

Further still, the present invention allows for effective use of otherwise unorthodox, impossible, or unadvised firing positions, such as:

For bullpup style rifles, often employed by special forces, aiming down conventional optics is typically a grievance. However, without having to aim-down-sight, the full aiming agility and mobility offered by a bullpup has its full potential unleashed with the invention.

And, aiming behind a metal ballistic shield with a ballistic glass viewing panel, the invention allows for active aiming beyond the protective cover of the shield while discharging the firearm around it—whereas one would have to expose themselves further to fire while aiming.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3A is a front view of an active matrix color OLED panel module for use therewith;

FIG. 3B is a rear view thereof;

FIGS. 4A, 4B and 4C are front, rear and side schematic views thereof, respectively;

FIG. 5 is a schematic of an electrode structure for use therewith;

FIG. 7 is a schematic representation of a firearm sensor for use therewith adapted for mounting on a standard US Picatinny rail quick release mounting system;

FIG. 8 is a schematic of the firearm mounted sensor module for use therewith.

DESCRIPTION OF THE PREFERRED EMBODIMENTS

Figure 1:
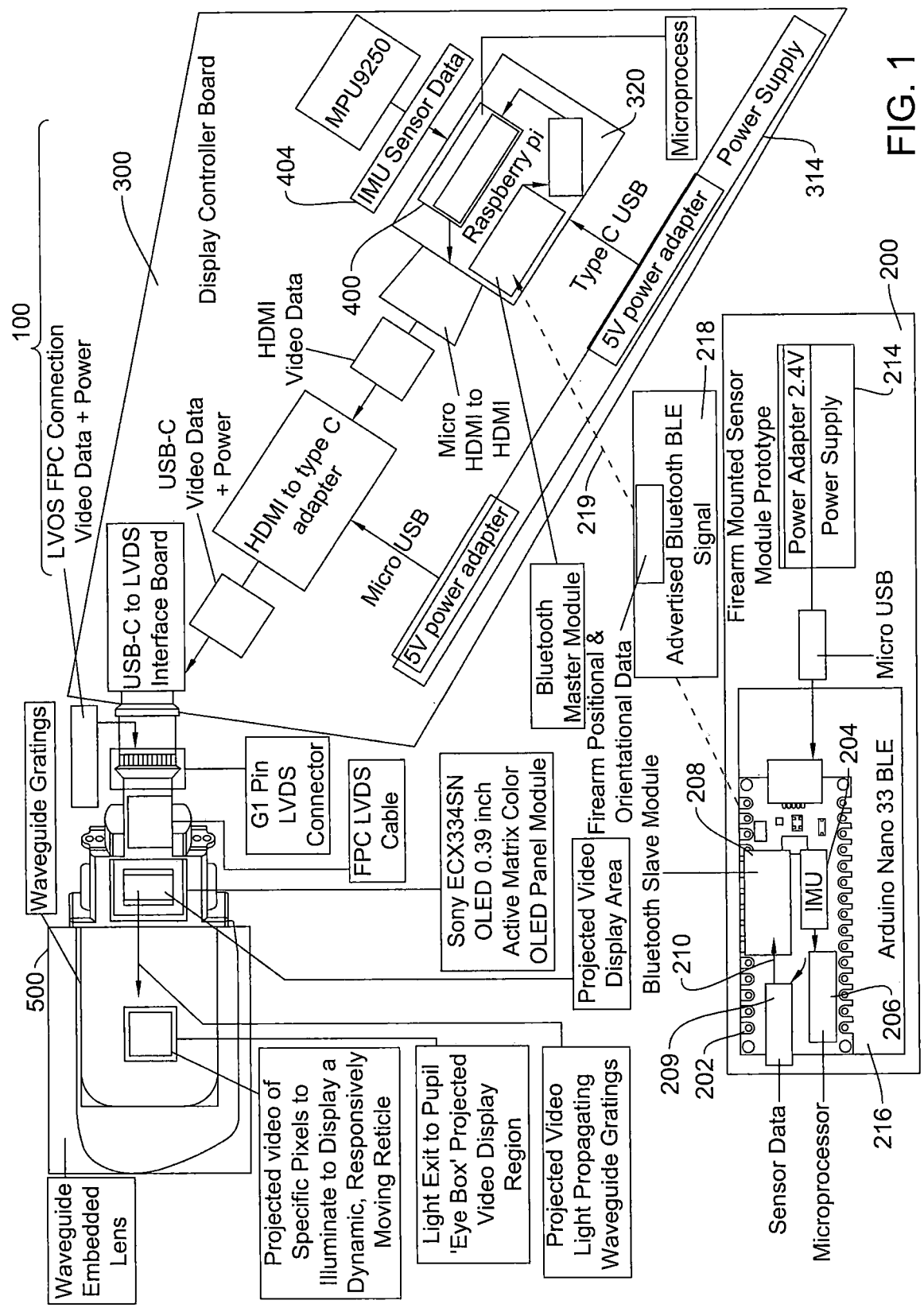
FIG. 1 is a schematic of a firearm mounted sensor module 200 for use in conjunction with augmented reality heads up display firearms sight 300 according to a preferred embodiment of the present invention.
Figure 2:
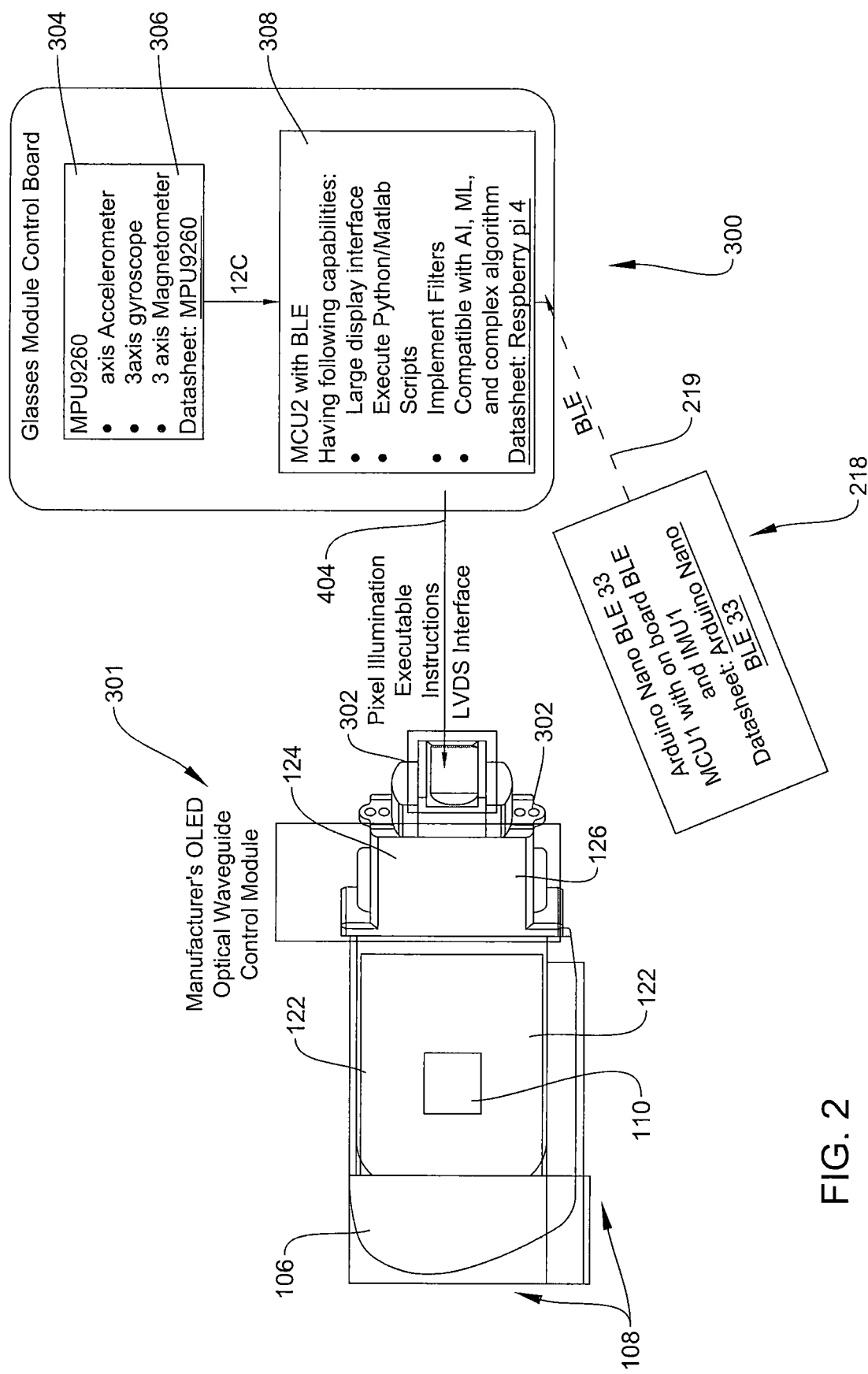
FIG. 2 is a schematic of a viewing lens architecture and augmented reality heads up display firearms sight formed by a lens mounted circuit board 302 for use therewith.
Figure 6A:
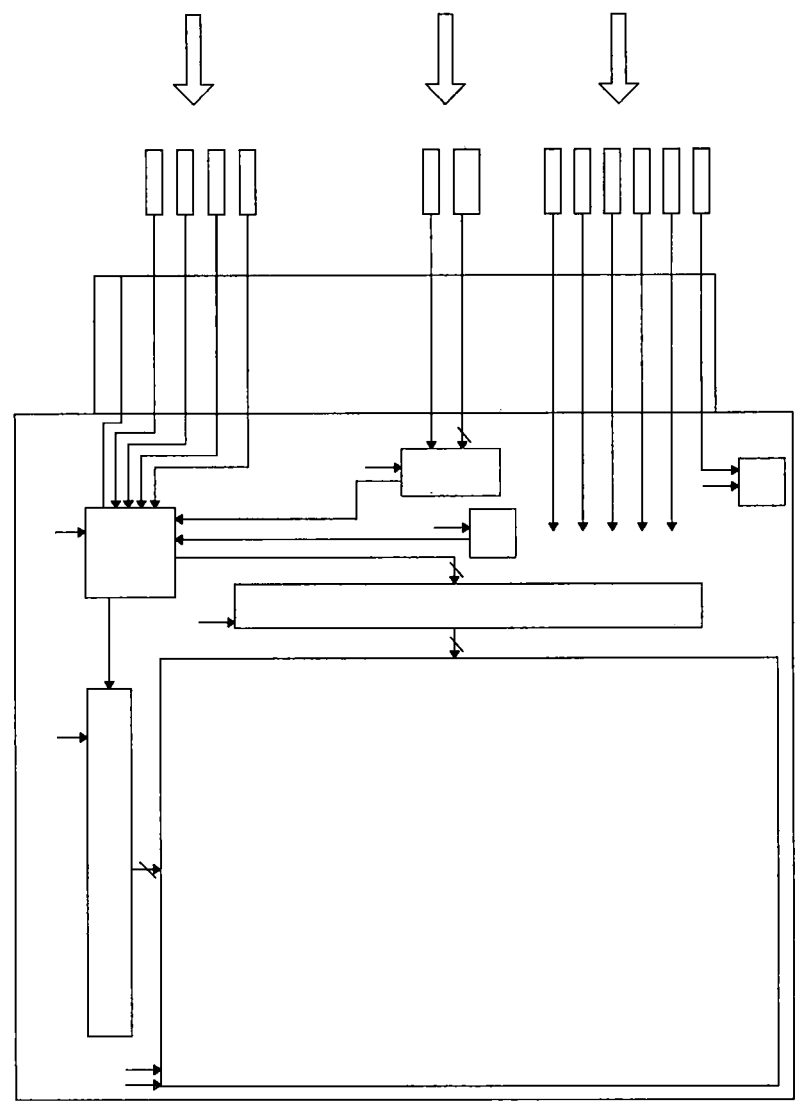
FIG. 6A is a schematic of a hardware architecture for the augmented reality heads up display area according to the preferred embodiment of the present invention.
Figure 6B:
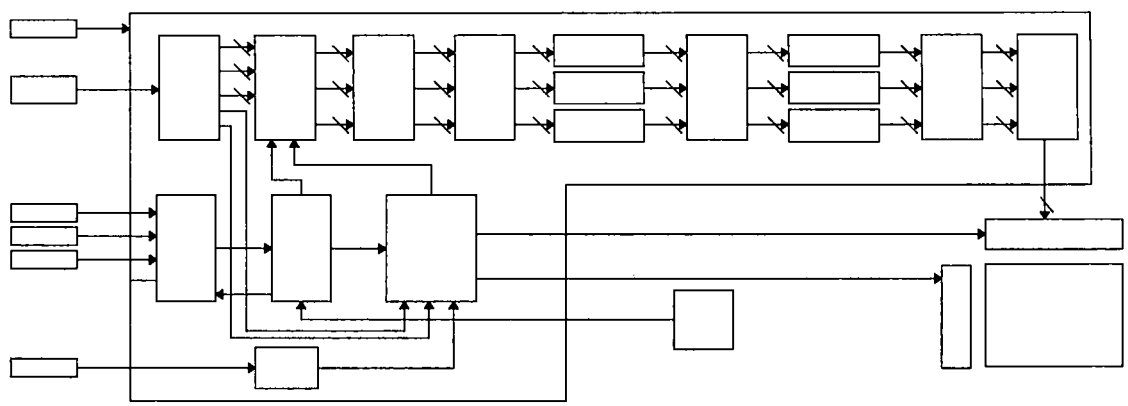
FIG. 6B is a schematic of the active matrix color OLED panel module for use therewith.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, an augmented reality heads up display firearms sight, generally noted as 100, is provided incorporating glasses, goggles or similar or equivalent eye wear 102 in order to remove a need to aim down a weapon's barrel or sight 104 while using a firearm 106.

The system 100 may consist essentially of a firearm mounted sensor module 200 in wireless communication with a wearable display mounted computing module 300.

Figure 9B:
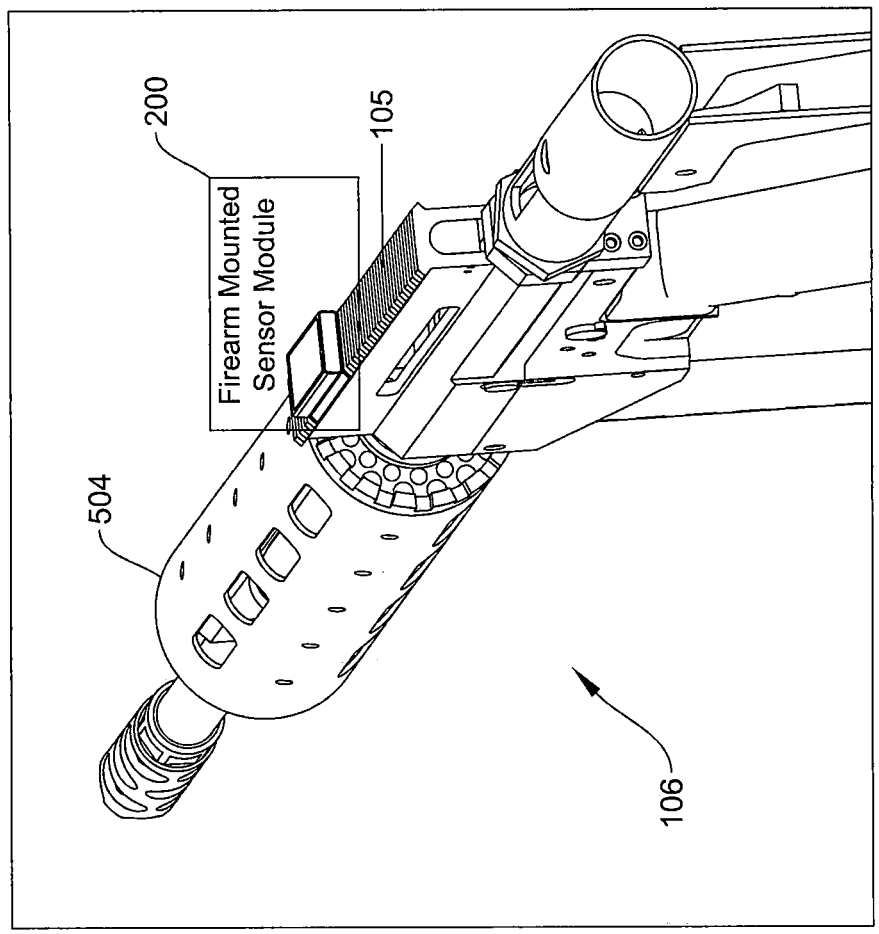
FIG. 9A through FIG. 9C are schematic representation showing various layouts of weapons mounted sensor modules for use in conjunction with the augmented reality heads up display firearms sight according to the present invention.
Figure 9A:
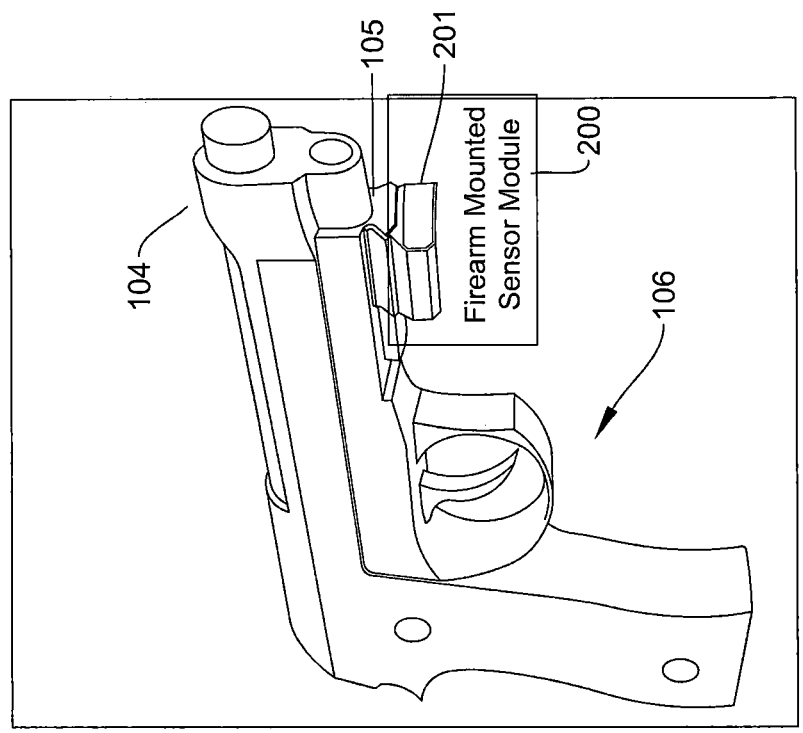
Figure 9C:
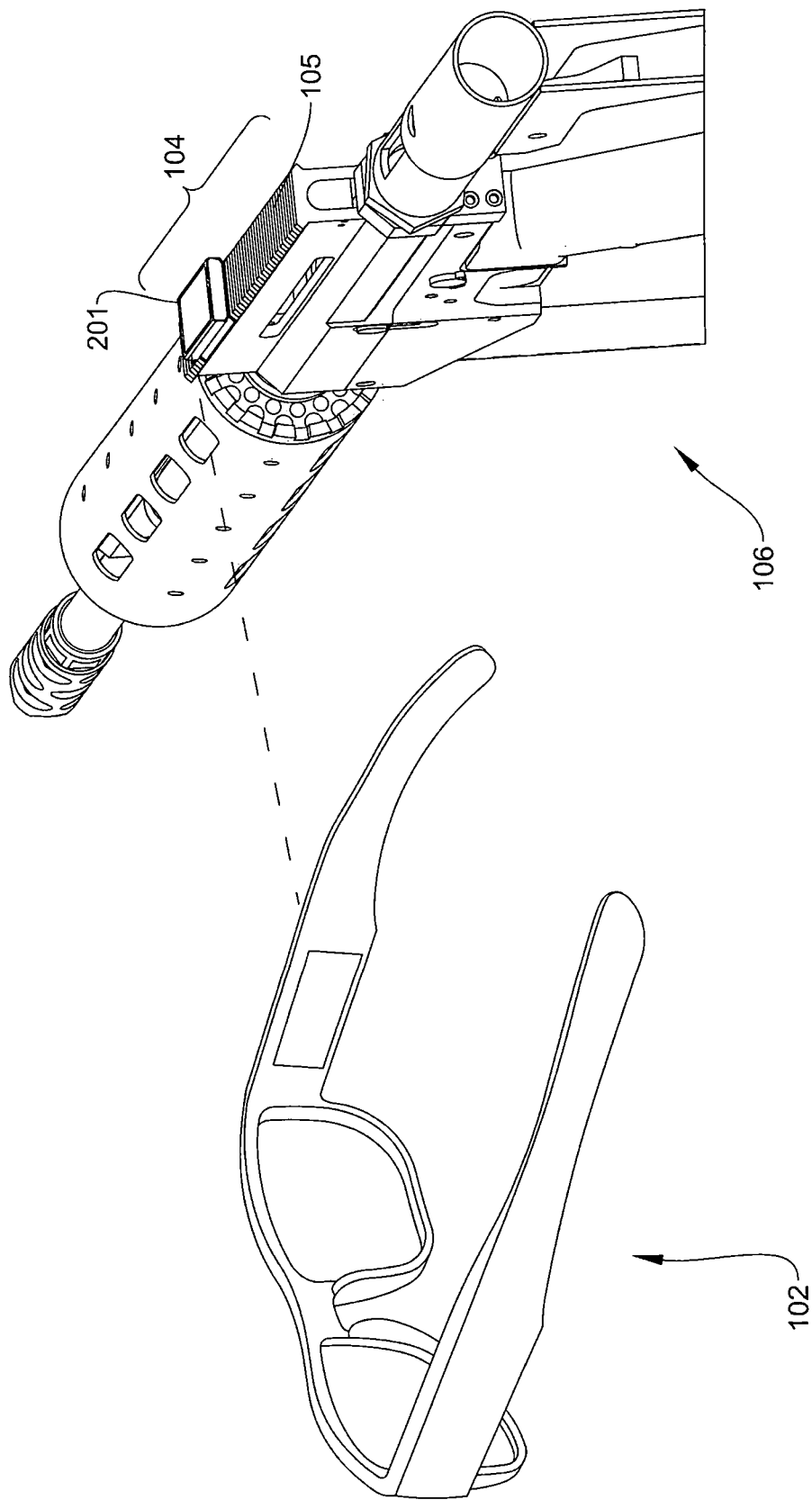

The firearm mounted sensor module 200 may be in a form of a housing 201 mountable directly to a barrel 104 of a firearm 106. As would be understood by those having ordinary skill in the relevant art, the mounting of the housing 201 to a barrel 104 may be in the form of a Picatinny rail mounted accessory ("Pic rail" known as a MIL-STD-1913 rail or NATO standard STANAG 4694 Accessory Rail) or similar or functionally equivalent accessory mounting system, generally noted as 105. As depicted throughout the figures a firearm 106 is shown in the form of a long gun such as, but not limited to a rifle such an AR-15 rifles (FIG. 9B). However, is should also be apparent to those having ordinary skill in the relevant art, in light of the present teachings, that the depiction of a long gun is merely meant to be exemplary and non-limiting and, as such, the use of handguns or other types of non-mounted firearms should be considered to be functionally equivalent (FIG. 9A). The housing 201 may enclose the circuit board 202 that may support at least a first sensor module 204, such as an Inertial Measurement Unit (IMU) sensor to detect movements and measure the intensity of movements in terms of acceleration and rotational speeds 209. A wireless communication module 208 for communication X-Y-Z firearm position data 210 in a wireless communication signal 212.

It is understood that various different configurations of sensor modules may be provided in order to detect and measure movements that can be calculated to determine barrel position and orientation. If using a sensor package that does not include a gyroscope, the measuring of tilt may be via an accelerometer with a correlation generated between accelerometer tilt and voltage. In conjunction with more advance sensor mechanisms the addition of Euclidean distance may be provided utilizing a Received Signal Strength Indicator (RSSI), where distance may be derived from a Bluetooth RSSI beacon between the firearm wireless sensor module master module 208 and a Bluetooth slave module 218. This distance signal 219 may then be directed to the display controller board 300.

The X-Y-Z firearm position data 210 may further be improved via algorithms to relate a reticle movement with yaw measurement. A first magnetometer may be also provided to derive additional data regarding rotation (e.g., 'yaw') and supplement accelerometer-derived data 209. Received signal strength indication ("RSSI") may also be provided with signal strength in order to allow for adjustment for any lag or latency issues, as well as to provide additional data for both rotation and assist with any error-correction. Additionally, filtering approaches such as Kalman Filters may be employed to further enhance data quality. With the inclusion of a gyroscope within the deployed sensors, movement of the HUD reticle may be improved by being substantially smoother and resistant to errors due to communication noise.

A power source such as a battery 214 may provide power within the firearm mounted sensor module 200.

The wearable display mounted computing module 300 may be in a form of a heads up display 301 incorporated into wearable glasses 102 as will be described in greater detail below. The computing module 300 may support a lens mounted circuit board 302 that may support at least a second triaxial accelerometer 304, a second analog to digital converter 306, and a wireless communication receiver module 308 for receiving the wireless communication signal 212. A second magnetometer 316 may be placed within the glasses to derive additional data regarding rotation (e.g., 'yaw') as well as other supplement accelerometer-derived data. Executable pixel illumination instructions 404 may be sent via Bluetooth BLE to the other optical module for display. An RSSI signal strength related to the aforementioned process, coupled with an RSSI signal strength between the firearm's sensor module and the glasses, can be used to further refine accuracy in pixel placement, adjust for any lag or latency issues, provide additional data for both rotation and assist with any error-correction. The RSSI signal strength between the two glasses BLE Bluetooth modules can serve as a frame of reference for interpreting RSSI signal strength from the firearm mounted sensor. Additionally, filtering approaches such as Kalman Filters may be employed to further enhance data quality. A separate or second power source such as a battery 314 may provide power to the display 300. A microcontroller or computer module 320 may be in operational communication with the second triaxial accelerometer 304 for calculating X-Y-Z digital position data of the position of the wearable display 106, as well as the X-Y-Z digital position data of the position of the firearm position 210.

As shown in conjunction with FIG. 3 through FIG. 5, the lens mounted circuit board 302 forms an augmented reality heads up display firearms sight formed within one or more eyeglass lens 106. Each lens 106 may form non-illuminated areas 108 as well as an optical waveguide display area 122. A waveguide control module 124 in operational communication between the waveguide 122 and a circuit board interface 126.

The glasses 102 may illuminate a sighting image 110. The sighting image 110 may be in a form of an aiming reticle that corresponds with the direction a firearm 100 is pointing based upon digital firearm position data 212. The aiming reticle sighting image 110 is augmented with a virtual visualization of a linear trajectory 112. The linear trajectory 112 may be adapted to correspond to a bullet path. The glasses 102 comprise the wave guide 122 forming a 'See-Through-Display' of transparent material that incorporate a superimposed image 110 onto/within the lens 106. The optical wave guide 122 may be formed onto the lens 106. The optical wave guide 122 may be formed of an organic light-emitting diode (OLED or organic LED) providing an electroluminescent layer 124 film of organic compound that emits light in response to an electric current.

It should be apparent to one having ordinary skill in the relevant art, in light of the present disclosure, that functionally equivalent alternate embodiment of the OLED optical wave guide should be broadly construed to be functionally equivalent to a liquid crystal on silicon ("LCoS" or "LCOS") array to provide a functionality of a superimposed image of light in response to the electric current. The use of OLED or LCoS waveguides allow for the control of the superimposed image of light electronically utilizing changes in voltage based on tilt, with the voltage being calibrated to work with the see-through-display lens platform's voltage range.

Such a display may further incorporate the usage of holographic, transreflective, and diffractive waveguide displays as alternative types of see-through-displays utilizing waveguides. The aiming reticle is augmented with a virtual visualization of a linear trajectory. The linear trajectory may correspond to a bullet path. The glasses comprise a viewing lens forming a 'See-Through-Display' of transparent material that incorporate a superimposed image onto/within the lens. An optical wave guide is formed of an organic light-emitting diode (OLED or organic LED) providing an electroluminescent layer film of organic compound that emits light in response to an electric current. In a functionally equivalent alternate embody the OLED optical wave guide may be replaced using a liquid crystal on silicon ("LCoS" or "LCOS") array to provide a superimposed image of light in response to the electric current. It is anticipated that additional techniques may be employed as alternate approaches or technologies for creating a waveguide based see-through display. These may include the use of quantum dots to create similar effects should be considered within the platforms this invention(s) operates. Different methods to creating waveguide gratings within the lenses and how the light propagates them would be holographic, geometric, diffractive, transreflective waveguides.

The display may further incorporate a number of enhancements. According to one configuration of the invention may utilize monochromatic waveguide based displays, where only one color is utilized in order to display data and its digital visualization. In such cases the color luminosity or general brightness may be limiting. While limiting the displayable color spectrum, enhanced brightness providing greater ease of outdoor, daytime visibility can be a more important, desired feature. Monochromatic waveguides further offer more particular value to use cases noted for the invention since many lack a need for a multi-color display versus a brighter one, whereas many others monochromatic waveguides would provide limited value except for certain use cases.

According to another configuration of the present invention, waveguide technology fusion may be implemented wherein layered waveguide lenses, which could also include separate technologies such as backlit waveguide displays, are physically superimposed to create independent digital image or video data displays. Such a variant provides a number of benefits, including complex visualizations which would otherwise require collating disparate video data feeds into a singular one for display, and having their respective video data feeds superimposed physically. Further, reduction of computational power and cost may be achieved while providing low latency performance. Methods such as this could also expand the visible the area of the lens where a digital image or video can be perceived without obfuscation by the human retina, otherwise known as the 'eye box', in addition to effectively expanding pixel density overall in the system through the use of multiple, superimposed displays.

According to yet another configuration of the present invention, a ballistic glass waveguide lenses may be utilized where the transparent medium utilized in the waveguide lenses is resistant to ballistic impact, or utilizes a similarly ballistically resilient transparent, protective layer shielding the lenses. The usage of this would not be anticipated for implementation within a glasses or helmet mounted system; rather, for armored equipment such as tanks, APCs, or similar which may be employing FLIR imaging systems, which could utilize the invention and ballistic glass to enhance existing imaging systems or to create distinct ones. The qualities provided to such equipment would become more apparent as other features are developed, where its implementation alongside ballistic resistant transparent structures provides greater capabilities than those existing.

As identified in the prior listed and discussed Related Art, otherwise conventional augmented reality and virtual reality devices use visual input from cameras, which are typically coupled with computer vision technology to achieve an imposition of an augmented reality imaging impressions onto a viewing lens to generate a superimposed image onto a display. In contrast, the present invention eliminates the need for such optical input systems for positioning the superimposed image, but rather operates without cameras by solely relying on tilt/directional data from the first triaxial accelerometer 204 mounted on the firearm and the second triaxial accelerometer 304 integrated within the glasses.

The glasses-integrated accelerometer 304 may serve as a frame of reference, with any directional shifts between the end user's head 101 and firearm 102 being accounted for and the correct direction being displayed. The microprocessor 320 may provide an equivalent of a calculation of any vector math by identifying the relative X-Y-Z positions between the barrel 102 and glasses 104 such that a voltage output 400 may be continuously generated in real time, with changes in voltage being based on relative tilt between barrel 102 and glass 104. Such a voltage 400 may be calibrated to work with the see-through-display lens platform's voltage range. Each analog to digital converter 206, 306 would interface with the respective accelerometer 204, 304 to provide the controller 320 with a range of voltages which combine to form collated position data 402 that are used to generate pixel illumination executable instruction 404 reprebting discrete points (X, Y, Z coordinates). Pixels contained within the OLED waveguide display 124 would be highlighted in an illuminated color, such as green or red, based off the corresponding coordinates from the accelerometers. The firearm mounted accelerometer 204 may interface with the glasses 102 wirelessly. For purpose of enabling a preferred embodiment, the use of Bluetooth receiver/transmitter components are anticipated as being used. However, such wireless communication may be via Bluetooth®, infrared wireless, ultra wideband, induction wireless, Zigbee, Z-wave or LoRaWAN, or may include any other functionally equivalently used Internet of Things (IoT) remote application for wireless communication.

According to alternate aspects of the preset invention, a platform may be provided that include one or two lenses.

According to any such embodiment, it is an aspect of the present invention that the use of a range adjustment setting may be additionally provided. Such a range adjustment may allow a user to give further precision for the illuminated reticle's placement in the lenses as well as adjust its placement for a more accurate reflection of a bullet's trajectory in relation to a target at distance. Such an adjustment may provide an average adjustment measure correlated with certain increments in distance which would influence the reticle's coordinates and corresponding pixels illuminated. By way of example, and not meant as a limitation, a setting adjustment may be manually incorporated in the glasses as a set of two buttons or a dial that would correspond with certain increments of distance such as to provide an incremental adjustment amount of increase or decrease in the setting that may correspond to an adjustment in set distance (such as, for example, +/−10 meter increments). Another embodiment of an adjustment implementation may be done digitally through a software or portable device application, such as on a mobile phone, to provide more specific distances to be entered and effectively adjusting the reticle's placement settings in a similar manner.

According to any such embodiment, it is an aspect of the present invention that the wireless may be provided between sensor modules 200 mounted on one or multiple firearms. This may appear as an all in one device, or as multiple combined modules. Such sensor modules may be synchronized and paired manually with one of many glasses modules 300 in order to connects a sensor module 200 that is in proximity with the glasses module 300. Such pairing may be initiated pairing mode through an alternate functionality of the same button mechanism utilized for range adjustments. According to an alternate aspect of the present invention, such pairing may also involve the use of the portable device application, as well as providing a signal powering on the sensor module and initiating wireless communication between components. Such an application may also allow the user to rename each sensor module to assist them in indicating which sensor module corresponds to which firearm it is mounted on.

According to any such embodiment, it is an aspect of the present invention that a Loaded/Unloaded Indicator may be further provided as part of the augmented visual display. In one such implementation, a sensor module 200 may include an accelerometer designed to detect the shock of recoil through spikes force or momentum applied to the firearm 100. Such a firearm mounted accelerometers may typically identify a force spike measure up to 17,500 kph per second. By allowing for the identification of a capacity of a magazine being used, analog data from such an accelerometer may be converted to a digital format by passing it through an analog to digital converter, and communicated to the glasses computer module, to tally events when the firearm was fired and a round discharged from the magazine. A counter accumulating such tallied events may thereby be compared with the magazine capacity inputted in order to identify when no rounds remaining in the magazine or barrel. Such an indicator may be further in the form of a color change of the reticle to indicate this status to the user. Such a feature may inform a user whether a firearm is loaded or unloaded, and may mitigate hazards associated with a firearm user not realizing if a round remains in the firearm's chamber. Similarly, such a magazine capacity feature may also be provided through a smart phone application.

According to any such embodiment, it is an aspect of the present invention that portable device application features such firmware update may be provided. Such tracking or updates may further be provided through wireless communication between application, sensor module 200 and glasses module 300.

2. Operation of the Preferred Embodiment

In operation the use of OLED or LCoS waveguides 122 within the present invention allow for the control of the superimposed image of light electronically utilizing changes in voltage based on tilt, with the voltage being calibrated to work with the see-through-display lens platform's voltage range. This may eliminate substantial complexity and cost, while providing performance improvements and allowing for robust operations in a variety of environments.

A controller 320 may be employed to collate directional voltage data 402 from the accelerometers 204, 304 and converting them into coordinates which are communicated in terms of pixels to illuminate to the optical waveguide OLED lens module 124. The controller 320 may run a Linux or Android® operating system, or any functional equivalent, to perform the computations.

In terms of various hardware architecture, the controller 320 may further be provided as an application specific integrated circuit (ASIC) made specifically to perform the intended functions. The firearm mounted sensor module 200 may also form an enclosure that is either affixable to a surface or, preferably, formed to a integrate with a near universal rail system such as the Picatinny rail. With the module 200 being affixed to such a mounting rail, an accurate placement of the firearm mounted sensor module 202 may consistently align with the weapon barrel 102. The sensor module 200 may be in the form of an enclosure that may protect its operation from environmental damage. In an alternate configuration, the sensor module 200 may be in the form of an enclosure that may be affixed to an adapter to make it compatible with any Picatinny rail, and may be sold as an enclosure separately affixed to a universal mount that can be affixed to a Picatinny rail adapter alongside a number of adapters to fit different rail and optic mount platforms. In yet another anticipated configuration, the sensor module enclosure 200 may be provided pre-affixed to a Picatinny rail adapter, where the adapter can be unscrewed leaving behind the enclosed sensor module which can be affixed to separate a near-universal mount adapter that would act as an adjustable clamp to fit a variety of conventional firearms.

Compared to current red-dot optics, the operation of the present invention may incorporate the same aiming mechanism directly into the glasses avoiding the need to aim down sight. Furthermore, the present invention obviates difficulties associated with calibrating conventional red dot sight, primarily ensuring the conventional optic is co-witnessed, mounted appropriately, and 'zeroed in' to account for discrepancies between the red dot and actual bullet trajectory by firing the weapon and adjusting its X and Y positions to more closely reflect the actual trajectory.

Another feature would provide the ability to track the location of a firearm in the event of theft and/or unauthorized use. This may be accomplished by including a GPS module in the firearm mounted sensor to allow the user to track a firearm's location, and in the event of theft/misuse the user could notify authorities with this information. The GPS module may also allow for automatic notifications, such as to appropriate authorities, upon detection of the firearm when within certain restricted areas such as a school or else here as may be identified by laws within the jurisdiction where the firearm may be located.

Finally, additional portable device application features may be provided such as system analytics. When connected with the sensor module or glasses, data may be transferred to a remote third party location via the cloud or such data stored in a retrievable manner from the firearm sensor module. Data provided may include GPS coordinates and an event data log of locations where firearm discharge had occurred. Those two pieces of data an analytical, predictive model of where the gun has been used, or is likely to be used, may be created.

3. Applications Extensions of the Present Invention

As should be apparent to those having a sophisticated skill in the relevant art and in light of the present invention, the teachings, features and improvements incorporation augmented reality pursuant to the present disclosures may be adaptable to a variety of applications. By way of example, and not meant as a limitation, these may include the following.

Recreational Games or Training Simulations. Games or training simulations that involve non-lethal projectiles, whether airsoft pellets, foam projectiles, paintballs, or digitally simulated projectiles (e.g., lasers in laser tag) could both employ the invention for purely assisted aiming benefits and for training and games, otherwise predicated on having fixed, sensing, networking, computational processing, and localization technologies, that are not wirelessly tethered to technologies in a fixed location.

Under these scenarios, the sensor module, that is otherwise mounted to firearms and only interfacing with the glasses assembly via Bluetooth wireless communication, could advertise its Bluetooth signal where it may be detected by other sets of glasses given their Bluetooth settings are reconfigured to detect Bluetooth signals aside from its corresponding bluetooth slave transmitter. With this, the Euclidean distance derived from the received signal strength indicator or RSSI between the glasses master bluetooth receiver and another Bluetooth slave's advertised signal, not originating from the respective slave wirelessly coupled to the glasses, can serve as a means of identifying whether the user corresponding to the separate Bluetooth slave was struck by a digital representation of a projectile launched upon operating a platform's firing mechanism. Notably, this wireless exchange is a peer-to-peer interaction which allows the system in this embodiment to be more mobile, and realistic. The digital representation of a projectile could also be fired without an accompanying platform, by using the sensor module mounted to any hand held apparatus or directly attached to the body, alongside a button or similar to trigger the firing computational process which could be included in the glasses, the Bluetooth slave sensor module, or as integrated in a platform such as one mimicking the physical appearance and dimensions associated with firearms. A button, or physical trigger for the firing process, is not necessary, and could be replaced with voice control, or a camera, potentially assisted by both computer vision and existing sensor data sources, to enable a gesture recognition based firing function—however, producing dedicated hardware distinct from the firearm sight system for this usage is unlikely as it can be successfully implemented with only programming alterations versus more costly hardware changes. An embodiment with hardware changes could involve infrared light, lasers, wireless communication methods, and facial, object, or wireless signal signature recognition. A cartesian coordinate plane formed between the Bluetooth wireless slave and master, as used in the invention, could serve as a defined area, or 'hit box' as referred to in video games, where whether digital projectiles successfully struck the target is determined upon the separate slave's alignment with the defined area upon initiation of the firing process. Further, the usage of the invention in this capacity, owing to the mixed reality platform employed, could allow digital image or video data to be displayed which corresponds to the game or training exercise which it is used; this could include representations of points that are deducted by successful strikes, other point indicators, overlays to indicate a team's affiliation, a users name, a representation of the amount of digital ordinance remaining, or other image or video data that is relevant to the game or training exercise.

Drone Usage. The use of augmented reality glasses may be used as an augmented reality user interface to combine overhead UAV video feed. A drone's camera-gathered video data may be send and displayed in an LCoS or OLED mixed reality waveguide display, thereby providing an individual with a 'bird-eye' or 'third-person' view of themselves or surrounding areas. An optical wave guide is formed of an organic light-emitting diode (OLED or organic LED) providing an electroluminescent layer film of organic compound that emits light in response to an electric current. In a functionally equivalent alternate embody the OLED optical wave guide may be replaced using a liquid crystal on silicon ("LCoS" or "LCOS") array to provide a superimposed image of light in response to the electric current.

The use of OLED or LCoS waveguides allow for the control of the superimposed image of light electronically utilizing changes in voltage based on tilt or directionality of a wearable user interface, with the voltage being calibrated to work with the see-through-display lens platform's voltage range. Furthermore, a user may be allowed to direct the UAV camera by identifying an X-Y-Z direction identified by the user.

Healthcare. Healthcare augmented reality glasses may be incorporated to remove the need to read health care monitoring equipment directly while being moderately physically remote. The glasses may illuminate a graphical user interface connecting with a data stream that corresponds with the direction a healthcare worker is facing. The graphical user interface is augmented with a virtual visualization of a health care monitoring equipment output. The glasses comprise a viewing lens forming a 'See-Through-Display' of transparent material that incorporate a superimposed image onto/within the lens. An optical wave guide is formed of an organic light-emitting diode (OLED or organic LED) providing an electroluminescent layer film of organic compound that emits light in response to an electric current. In a functionally equivalent alternate embody the OLED optical wave guide may be replaced using a liquid crystal on silicon ("LCoS" or "LCOS") array to provide a superimposed image of light in response to the electric current.

The use of OLED or LCoS waveguides allow for the control of the superimposed image of light electronically utilizing changes in voltage based on tilt or directionality of a wearable user interface, with the voltage being calibrated to work with the see-through-display lens platform's voltage range. Furthermore, the present invention's operation and configuration allows a healthcare worker to access a patient's medical data stream by identifying an X-Y-Z that corresponds with the relative direction between an identified patient and the healthcare worker.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. It is anticipated that such variation may leverage see-through-display technology of existing manufacturers, OEM providers, or other sources that may use integrated ASICs or auxiliary components necessary to interface with the specific display platform employed. Due to this, the voltage output from the accelerometers may be calibrated to work with the voltage and pixel arrays manufacturer's optical waveguide OLED lenses.

In light of such variations and adaptations, the exemplary claims provided are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

I claim:

1. A heads up display comprising:
    a waveguide display incorporated into an eyewear and having accelerometer sensors outputting a "view angle" that is compared with line of sight or "head angle" and true horizon combined to generate data points combined to create a full 3D spacial image of a target;
    a camera image of the target superimposed on the eyewear;
    the target distance generated relative to the view angle and delivered to an eyeware driver adapted to convert the view angle to a pixel command generating an illuminated aiming reticle on the eyewear that corresponds with a direction pointing to and overlaid on the target.

2. The heads up display of claim 1 adapted to a firearm's sighting system further comprising:
    a firearm;
    the firearm coordinated with said eyewear, said eyewear further comprising a wearable display of transparent material incorporating a superimposed image onto/within the lens, said image forming an illuminate aiming reticle that corresponds with a direction the firearm is pointing.

3. The firearm sighting system of claim 2, wherein the transparent material further comprises an optical wave guide to provide a superimposed image of light in response to the electric current and selected from a group consisting of: an electroluminescent layer film of organic compound that emits light in response to an electric current; and, a liquid crystal on silicon array.

4. The firearm sighting system of claim 2, wherein the wearable display comprises an augmented reality heads up display firearms sight incorporated into a pair of glasses, said system further comprising:
    a sensor module mounted on the firearm and in wireless communication with a computing module mounted on the wearable display.

5. The firearm sighting system of claim 4, wherein the firearm mounted sensor module is mountable onto a barrel of the firearm and further comprises:
    a first triaxial accelerometer adapted to generate an X-Y-Z position data of the barrel;
    a first analog to digital converter for generating a digital voltage signal corresponding with the X-Y-Z position data of the barrel;
    a first magnetometer for generating adjustments to the digital voltage signal based on a rotation of the barrel; and
    a wireless communication module for communicating the digital voltage signal to the augmented reality heads up display firearms sight.

6. The firearm sighting system of claim 4, wherein said computing module supports a lens mounted circuit board further comprising:
    a second triaxial accelerometer;
    a second analog to digital converter;
    a second magnetometer for generating adjustments to the digital voltage signal based on a rotation of the lens mounted circuit board;
    a wireless communication receiver module for receiving the wireless communication signal correlating to the digital voltage signal; and
    a microcontroller or computer module in operational communication with the second triaxial accelerometer for calculating X-Y-Z digital position data of a position of the wearable display and relating the X-Y-Z digital position data of a position of the wearable display to the X-Y-Z digital position data of the position of the firearm.

7. The firearm sighting system of claim 6, wherein the waveguide displays an illuminating aiming reticle controlled by a voltage output changes of the microcontroller or computer corresponding to tilt/directional data from the first triaxial accelerometer mounted on the firearm and the second triaxial accelerometer integrated within the glasses.

8. The firearm sighting system of claim 5, wherein said computing module supports a lens mounted circuit board further comprising:
    a second triaxial accelerometer;
    a second analog to digital converter;
    a second magnetometer for generating adjustments to the digital voltage signal based on a rotation of the lens mounted circuit board;
    a wireless communication receiver module for receiving the wireless communication signal correlating to the digital voltage signal; and
    a microcontroller or computer module in operational communication with the second triaxial accelerometer for calculating X-Y-Z digital position data of a position of the wearable display and relating the X-Y-Z digital position data of a position of the wearable display to the X-Y-Z digital position data of the position of the firearm.

9. The firearm sighting system of claim 8, wherein the waveguide displays an illuminating aiming reticle controlled by a voltage output changes of the microcontroller or computer corresponding to tilt/directional data from the first triaxial accelerometer mounted on the firearm and the second triaxial accelerometer integrated within the glasses.

\* \* \* \* \*